United States Patent
Borrelli et al.

(10) Patent No.: US 6,260,388 B1
(45) Date of Patent: Jul. 17, 2001

(54) METHOD OF FABRICATING PHOTONIC GLASS STRUCTURES BY EXTRUDING, SINTERING AND DRAWING

(75) Inventors: Nicholas Francis Borrelli, Elmira; John Forrest Wight, Jr., Corning; Raja Rao Wusirika, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/360,672

(22) Filed: Jul. 26, 1999

Related U.S. Application Data

(60) Provisional application No. 60/094,609, filed on Jul. 30, 1998.

(51) Int. Cl.[7] .......................... C03B 37/075; C03B 37/02
(52) U.S. Cl. ................... 65/393; 65/401; 65/404; 65/427; 65/17.6
(58) Field of Search ................. 65/393, 401, 404, 65/409, 411, 427, 17.6

(56) References Cited

U.S. PATENT DOCUMENTS

| | | |
|---|---|---|
| 3,790,654 | 2/1974 | Bagley . |
| 4,127,398 | 11/1978 | Singer, Jr. ............................ 65/4 A |
| 4,902,216 | 2/1990 | Cunningham et al. . |
| 5,177,039 | * 1/1993 | Allaire ................................ 65/17.6 |
| 5,774,779 | 6/1998 | Tuchniskiy . |
| 5,802,236 | 9/1998 | DiGiovanni et al. ................ 385/127 |

OTHER PUBLICATIONS

U.S. application No. 60/068,230, St. Julien et al., filed Dec. 19, 1997.

T.A. Birks, et al., "Endlessly single–mode photonic crystal fiber", Optics Letters, Jul. 1, 1997, vol. 22, No. 13, pp. 961–963.

Anderson et al., "Larger Two–Dimensional Photonic Bans Gaps", Physical Review Letters, Sep. 30, 1996, vol. 77, No. 14, pp. 2949–2952.

Joannopoulos et al., "Photonic crystals: putting a new twist on light", Nature, Mar. 13, 1997, vol. 386, pp. 143–149.

* cited by examiner

*Primary Examiner*—John Hoffmann
(74) *Attorney, Agent, or Firm*—William J. Chervenak

(57) ABSTRACT

Disclosed is a method of making a photonic crystal using a combination of extruding and drawing techniques. The method is contemplated as being capable of producing both two and three dimensional crystals due to the maturity and diversity of extruding and drawing technology. The method allows the drawing of relatively large photonic crystals and is flexible enough to provide a periodic array of channels or filaments as the crystal features. After the extruding step or steps and before the step of heating and drawing, a plurality of elongated extruded bodies can be bundled and drawn as a unit.

35 Claims, 4 Drawing Sheets

METHOD OF FABRICATING PHOTONIC GLASS STRUCTURES BY EXTRUDING, SINTERING AND DRAWING

This application claims the benefit of U.S. provisional application No. 60/094,609, filed Jul. 30, 1998.

BACKGROUND OF THE INVENTION

The invention relates to a method of making photonic crystals and passive components comprising photonic crystals. In particular, the method includes one or more extrusion steps to produce a cellular or channeled object followed by a step of viscously sintering the object. The sintered, channeled object is heated and drawn to a final diameter.

A photonic crystal is a structure having a periodic variation in dielectric constant. The periodic structure may be 1, 2 or 3 dimensional. The photonic crystal allows passage of certain light wavelengths and prevents passage of certain other light wavelengths. Thus the photonic crystals are said to have allowed light wavelength bands and band gaps which define the wavelength bands which are excluded from the crystal.

At present, the wavelengths of interest for telecommunication applications are in the range of about 800 nm to 1800 nm. Of particular interest is the wavelength band in the range of about 1300 nm to 1600 nm.

Light having a wavelength in the band gap may not pass through the photonic crystal. Light having a wavelength in bands above and below the band gap may propagate through the crystal. A photonic crystal exhibits a set of band gaps which are analogous to the solutions of the Bragg scattering equation. The band gaps are determined by the pattern and period of the variation in dielectric constant. Thus the periodic array of variation in dielectric constant acts as a Bragg scatterer of light of certain wavelengths in analogy with the Bragg scattering of x-rays wavelengths by atoms in a lattice.

Introducing defects into the periodic variation of the photonic crystal dielectric constant can alter allowed or non-allowed light wavelengths which can propagate in the crystal. Light which cannot propagate in the photonic crystal but can propagate in the defect region will be trapped in the defect region. Thus, a point defect within the crystal can serve as a localized "light cavity". Analogously, a line defect in the photonic crystal can act as a waveguide for a mode having a wavelength in the band gap, the crystal lattice serving to confine the guided light to the defect line in the crystal. A particular line defect in a three dimensional photonic crystal would act as a waveguide channel, for light wavelengths in the band gap. A review of the structure and function of photonic crystals is found in, "Photonic Crystals: putting a new twist on light", Nature, vol. 386, Mar. 13, 1997, pp. 143–149, Joannopoulos et al.

A first order band gap phenomenon is observed when the period of the variation in dielectric constant is of the order of the light wavelength which is to undergo Bragg scattering. Thus, for the wavelengths of interest, i.e., in the range of about 1300 nm to 1600 nm, as set forth above, a first order band gap is achieved when the period of the variation is about 500 nm. However, photonic crystal effects can occur in crystals having dielectric periodicity in the range of about 0.1 $\mu$m to 5 $\mu$m. A two or three dimensional photonic crystal having even this larger special periodicity is difficult to fabricate.

In U.S. Pat. No. 5,774,779, Tuchinskiy, a method of making multi-channeled structures is described. Rods are bundled together and reduced in diameter by extrusion. The step of bundling and extrusion may be repeated using rods which have already been extruded one or more times. However, no step of drawing is disclosed, so that channel density, expressed as number of channels per unit area, is not large enough to produce a photonic crystal.

There is a need for a method of making photonic crystals of two or three dimensions which is repeatable, versatile, and potentially adaptable to a manufacturing environment, as compared to that of a laboratory.

SUMMARY OF THE INVENTION

The primary object of the invention is to combine extrusion technology, including the technology of powder extrusion, with glass drawing technology to address the problem of fabricating photonic crystals of all types. The term drawing describes a process in which a viscous body of material is stretched along a pre-selected dimension. To stretch the viscous body without causing tears in the body, the viscosity of the body and drawing tension applied to the body are properly adjusted. The viscosity of the body may be controlled by controlling the temperature of the body.

A first aspect of the invention is a method of making a photonic crystal having a band gap. A material comprising at least one glass powder and a binder is extruded through a die to form a body having a first and a second face spaced apart from each other, each face having a plurality of openings. The respective openings in each face are the ends of channels, which extend along the dimension between the two faces.

Suitable glass powders for making the crystal include Pyrex™ and substantially pure silica powder. The extruded body is then heated to drive off the binder at a first temperature and further heated to a higher second temperature to viscously sinter the particulate of the glass powder to form a sintered, extruded glass body. This sintered glass body is further heated and drawn, along the dimension between the two faces, to reduce the diameter of the channels extending between the two channels. The drawn body is referred to as a glass rod or glass fiber having a plurality of channels which extend along the long axis of the fiber or rod. The drawing temperature is typically higher than the sintering temperature, although for certain glass compositions and drawing tensions the drawing temperature may be lower than the sintering temperature.

An optional series of steps may be used if, after extrusion, the body is too large to be accommodated in a drawing furnace. That is, the cross sectional area, taken perpendicular to the dimension between the two faces, of the body and thus the size of the plurality of channels may be reduced by:

filling the channels with a pliable material;

passing the body, in a direction along the channels, through one or a series of reducing dies; and, removing the pliable material.

This pliable material, which may be a micro-crystalline wax as set forth in Provisional Application No. 60/068230, serves to maintain the channels as the body is passed through one or a series of reducing dies. A reducing die may take the form of a funnel with an entrance opening of dimension commensurate with the cross sectional dimension of the body and an exit opening reduced in size by a factor of 2 or more relative to the entrance opening. After the reducing step, the pliable material is removed In order for the channeled glass fiber to function as a photonic crystal, the array of channel openings is distributed periodically across the faces of the fiber. For the wavelengths of particular interest at this time in telecommunications, the period of the array of the final drawn fiber or rod is in the range of about 0.4 μm to 5 μm. The novel method disclosed and described herein can produce arrays having periods less than 40 μm, preferably less than 5 μm and most preferably less than 1 μm.

Also, the dielectric constant of the channels must be different from that of the material forming the walls of the channels by a factor of about 3 to provide a useful band gap. For example the channels may be filled with air or evacuated to provide the requisite difference in dielectric constant. As an alternative the channels could be filled with essentially any solid or fluid having the appropriate dielectric constant as compared to that of the glass body.

The required dimensions of a photonic crystal depend upon the intended use thereof. Of particular importance is the crystal area which will be illuminated by a beam of light incident upon the crystal which will propagate through the crystal or a defect in the crystal. The area of the beam may be characterized, for example, by the mode field diameter of the beam. For wavelengths that are at present of greatest interest in optical telecommunications, i.e., those in the range of about 1300 nm to 1600 nm, mode field diameters may be expected to be less than about 10 μm. Thus a reasonable length of photonic crystal measured along the length of the periodic features, is in the range of 3 μm to 12 μm, in the case of side illumination of the crystal.

The area of a plane perpendicular to the length extent of the photonic crystal periodic features can be selected to be in the range of about 100 $\mu m^2$ to about 1.25 $mm^2$. Larger cross sections are possible using a bundling technique described herein. However, bundling is not well suited to providing uniform periodicity among the elements, such as rods, which make up the bundle. Maintaining common periodicity among the bundled elements is more feasible in the case of rods that can be given an orientation relative to each other which is maintained during heating and drawing. For example square, rectangular, or hexagonal shaped rods can be arranged in a close pack or other pre-selected pattern that will persist through the drawing step.

Such a choice of area is large compared to the light wavelength propagated and allows for line defects in the form of waveguide paths for couplers and splitters. However, it should be understood that the calculation of a band gap in a photonic crystal, or in a photonic crystal having a defect, contains the underlying assumption of a crystal structure essentially infinite in extent. What constitutes a crystal having effectively "infinite" dimensions is a question that must be answered by experiment.

In practice, the length of a photonic crystal made using the method disclosed and described herein is limited on the low end only by the technology available to cut a slice from the drawn glass body. The potential upper limit of length is very large when compared to the length required in optical circuits. The method may reasonably be expected to yield photonic fiber crystals having lengths of the order of tens of centimeters or more.

The glass material to be extruded has a particle size preferably less than about 5 μm. A more preferred particle size is about 1 μm. This size provides for good cohesion of the extruded material while allowing for the extruded wall thickness of the channels to be no less than 10 particle diameters, a practical upper limit for both direct particulate extrusion and the optional reduction particulate extrusion. However, larger particle size can be used in cases where a large part of the size reduction is done after the step of viscous sintering, because the particles lose their identities during the sintering step.

Extrusion dies are available which can introduce local or line defects into the elongated body during the extrusion step. Thus a cavity resonator, a waveguide, or a plurality of waveguides may be formed in the extrusion step. It will be understood that the integrity of the extruded body must be maintained during the extrusion steps. Thus in the case of void type defects which pass completely across the face of the photonic crystal, an outermost annular layer, i.e., a cladding layer, must be maintained though the draw step. After the drawing process, a layer designed to preserve the extruded body integrity may be removed by known mechanical or chemical means. If the layer is transparent to signal light, it may remain in place after drawing.

As an alternative, local or line defects can be created in the extruded body prior to drawing removing parts of the wall structure using either mechanical or chemical means. As an alternative, defects can be created by inserting or back-filling channels. If a reduction die extrusion is used, the embedding can be done before or after that step.

A particularly useful photonic crystal component is one having two intersecting waveguide paths. The crystal periodicity is chosen such that light propagating along the line defect, i.e., waveguide in the crystal is in the band gap. Thus, even at a right angle intersection of two waveguide paths the propagating light will make the right angle turn with essentially no loss. The only possible loss is that due to back scattering through the light input port. Here again it should be noted that the statement that the light traverses a bend with essentially no loss contains the tacit assumption of infinite crystal extent.

The method is also adaptable to the making of optical waveguide fibers which have a particular pre-selected channel pattern which extends along the long axis of the waveguide and terminates at the ends of the waveguide. It will be understood that other channel patterns may be found to be useful. For example, channels along the long axis may be intermittent, randomly distributed instead of periodic, or extend over only a few segments of the waveguide length. Also, channels which intersect the long axis, having either a periodic or random pattern, may be found to produce a particular propagation property which is useful in optical waveguide communication systems. Methods for producing channels which intersect the long axis include a piercing step which would be carried out during or after drawing.

An exemplary configuration that is worthy of study is one in which the center portion of the waveguide fiber is a solid glass. The center portion of the waveguide is surrounded by and in contact with a channeled structure which in effect forms the cladding of the waveguide. Such structures have been found to provide waveguide fibers which propagate a single mode over an unusually wide wavelength range. See, for example, Birks et al., "Endlessly Single Mode Photonic Crystal Fibers", Opt. Lett. 22 (13), 961, (1997). The performance of such a waveguide may be expected to change as the number of channels changes, the periodicity changes, or more than one channel size is used. In this latter case, two or more sizes of channels may be used, each of the sizes conforming to a selected periodicity pattern. The making of dies for extrusion of paste or plastic materials is a mature art. The dies required for the line defect, the cavity defect, or the porous cladding in any of its combinations of size and periodicity are known. The dies will therefore not be discussed further here.

For a discussion of the band gap associated with such multiple channel size photonic crystal structures, see, for example, Anderson et al., "Larger Two Dimensional Photonic Band Gaps", Phys. Rev. Letters, V. 77, No.14, p.

2949–2952, Sep. 30, 1996. In this reference, examples of structures which have a band gap and in which the number of different channel sizes is 2 are described.

Another potentially useful embodiment of the method is an optical waveguide fiber that includes a center channel which is surrounded by a periodic array of channels of smaller dimension. The existence of a band gap for such a configuration exists in theory, but has not been verified by experiment. As noted above, the die technology exists for making such extruded bodies for later, size reduction, viscous sintering, and drawing to form a waveguide fiber.

In a second aspect of the invention, the method may be used to produce a plurality of glass rods or tubes as described in the first aspect above. Prior to the step of heating and drawing the glass rods into smaller diameter rods or fibers, two or more rods may be bundled and drawn as a unit. This unit may be drawn in a single step or in drawing and rebundling steps that are repeated until a target size is reached. The resulting elongated object can be:

a "polycrystalline" object, i.e., a cluster of photonic crystals having the same periodicity but not oriented such that the periodicity is maintained from one photonic crystal to the next; or, a cluster of photonic crystals having more than one periodicity, i.e., more than one set of pass bands and band gaps.

As stated above, depending upon the bundling process and the shape of the bundled rods, the bundling process can produce either type of polycrystalline body or a body comprising a cluster of photonic crystals.

A further aspect of the invention are the photonic crystals which can be made using the methods disclosed and described herein.

Yet another aspect of the invention is a method of making a photonic crystal in which two or more types of glass powder, having different dielectric constants and mixed with one or more appropriate binders, are co-extruded to form an elongated body having a periodic array of filaments of one glass/binder type that extends from one end of the body to the other, separated from each other by walls comprising the other glass/ binder type. In the art the glass/binder forming the walls is sometimes referred to as the matrix glass. An alternative method of making the crystal body containing at least two glass types includes backfilling or stuffing the channels formed in an initial extrusion. Following the initial extrusion step, this aspect of the invention makes use of essentially the steps as set forth in the first aspect of the invention.

DETAILED DESCRIPTION OF THE INVENTION

The photonic crystal art is still in a rapidly developing stage in which the fundamental shapes, properties and uses of two or three dimensional crystals are being tested.

The extrusion process is distinctly suited for making a wide variety of photonic crystals because the extrusion art:
is mature in that processes are available for extruding a wide range of materials and shapes;
is capable of producing periodic structures having very small wall thickness, a high degree of open frontal area, and a high channel (cell) density as measured in terms of number of channels (cells) per unit cross sectional area;
can be kept free of contamination, for example, by means of coated dies and mixers, so that the purity of extruded structures is limited only by the purity of the starting materials;
is compatible with glass starting materials such as amorphous silica powder mixed with a binder; and,
can provide, by means of reduction extrusion, a wide range of channel densities simply by changing the cross section area of the body produced in the initial or reduction extruding step.

The extrusion process is documented elsewhere and so will not be set forth in detail herein. The extrusion methods and apparatus used in the invention described herein may be found for example in U.S. Pat. No. 3,790,654, Bagley and U.S. Pat. No. 4,902,216, Cunningham et al. the specifications of which are incorporated into this document by reference. This technology is capable of extruding tens of thousands of channels simultaneously.

In an exemplary initial extrusion of a material, such as silica powder or Pyrex™ powder, through a die, a channel density of about 62 channels per $cm^2$ has been demonstrated. Subsequent passing of the initial extruded body through a reduction die, which may be a funnel, can produce a channel density of about 6200 channels per $cm^2$. Higher channel densities are then achieved by hot drawing the viscously sintered extruded substrate.

Figure 9:
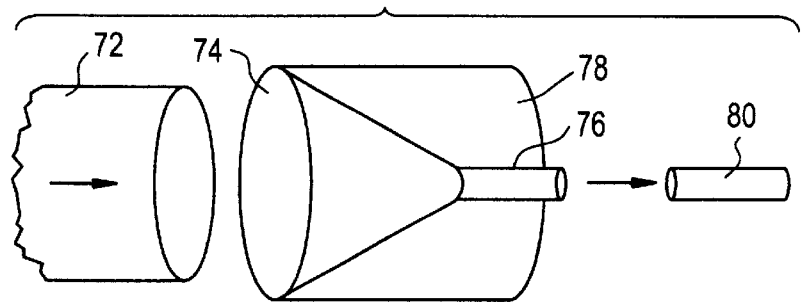
FIG. 9 is a drawing of a reducing die.

Referring to FIG. 9, reduction die body 78 is shown having an input funnel 74 into which the extruded body 72 is introduced. A mechanism for applying forward force to the extruded body, not shown, causes the extruded body to pass through reducing section 76 and emerge as reduced body 80.

After reduction extrusion, the minimum spacing between channel centers, assuming uniform wall thickness, is then of the order of 30 $\mu$m, a limit which is set by the desire that the minimum web thickness be about 10 particle diameters. It is understood that this wall thickness can also be achieved by extruding followed by heating and drawing. That is, the reduction step is optional and typically is used in those cases where the drawing furnace dimensions are a limiting factor.

To reach a feature spacing for certain applications of a photonic crystal, in the near infrared part of the spectrum, a spacing of about $\lambda/3$ or 0.5 $\mu$m is desired. However, the feature spacing may be larger than the sub-micron level, of the order of several microns, and still produce useful photonic crystal structures. In either case the extrusion process can be used to fabricate the photonic crystal structure. After the structure is extruded and then, optionally, further reduced by passing the body through a reduction die, the resulting body is heated to drive off the binder and then viscously sintered to produce a body which is heated and drawn to further reduce the thickness dimension of the body and reach the desired pitch, of the order of tenths of microns, characteristic of an optically active structure.

The combination of extrusion technology, with that of drawing, provides a unique and versatile process for fabricating photonic crystals. The extrusion process provides a wide range of cross sectional shapes while maintaining dimensional accuracy of the shapes. The dimensional accuracy of the drawing process, which meets or exceeds that of extrusion, make the combination of these two processes a powerful tool in the manufacture of photonic crystals.

The periodic array need not include channels of any kind, because the extrusion process, e.g., a back fill or co-extrusion process, can make use of one or more starting materials and embed a periodic array of one material within the matrix of the other. That is, the photonic crystal is a solid glass body which exhibits a periodic variation in dielectric constant of solid materials.

Figure 1:
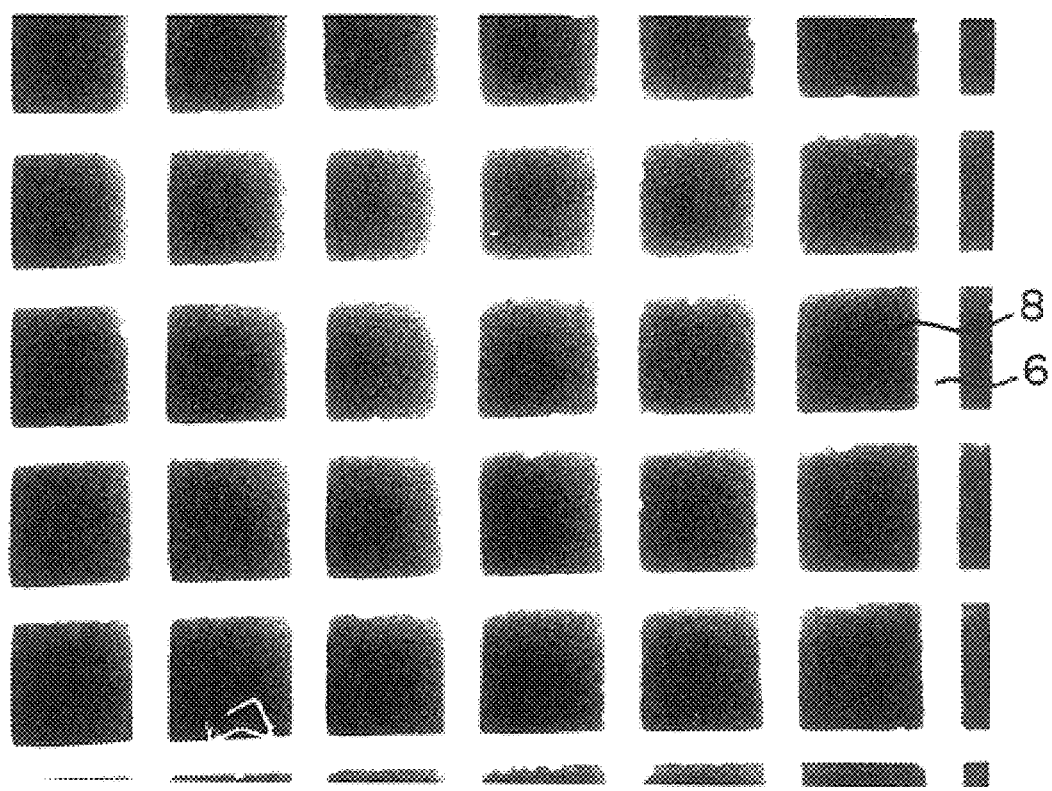
FIG. 1 is a picture of an extruded structure which has been viscously sintered.

The viscously sintered or extruded body shown in FIG. 1 is a periodic array of square channels. The body was made from an extrudate of silica powder in a binder. The extruded body was heated to drive off the binder. Subsequently the temperature of the body was increased to provide for viscous sintering. The regularity of the array is noteworthy. Depending upon the final configuration chosen for the photonic crystal, either the channels 8 or the walls (web) 6 of the extruded and drawn body could function as the periodic feature of the crystal.

Figure 2A:
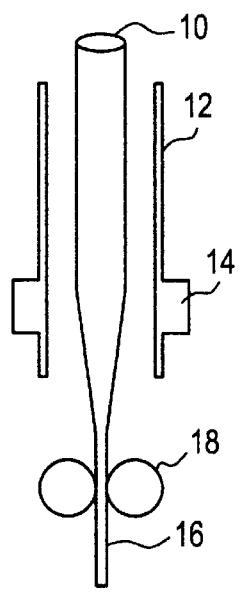
FIG. 2a is a schematic illustration of a viscously sintered extruded body in a drawing furnace.

A schematic representation of the drawing process is shown in FIG. 2a. The extruded, reduced, if needed, and viscously sintered body 10 is suspended in furnace 12. The suspending means, which include means for feeding the glass body into the furnace, are not shown but are known in the art. Coil 14 represents the heating element of furnace 12. The localization of the hot zone near one end of the furnace provides a furnace temperature profile that allows a continuous and uniform glass rod or fiber 16 to be drawn from the sintered body 10 by gripping means 18. Alternative gripping means are known, including types which translate with the drawn rod or fiber 16. The extruded and reduced body 10 may be viscously sintered during the drawing step if the tensile strength of the unsintered body is sufficient to support the draw tension. As has been noted above, if the extruded body or extruded and sintered body has a small enough diameter, the reduction may be excluded, and drawing begun immediately after the extrusion step. It is believed that the necessary geometry may be extruded into a preform having a diameter not substantially larger than about 5 cm, which is a size compatible with most draw furnaces.

Figure 2B:
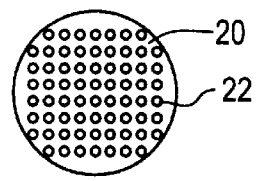
FIG. 2b is an illustration of a cross section of an extruded or a drawn body.

In an alternative embodiment of the invention, the draw down process is carried out in two steps. The viscously sintered body is first drawn into a rod or fiber which is then overclad and drawn to a fiber, which typically has a clad diameter of the order of 100's of microns and a photonic crystal core diameter of 10's of microns. This process is expected to be useful in obtaining structures having very high channel density. The cross section shown in FIG. 2b represents an extruded channeled body, an extruded and reduced channeled body, or an extruded, reduced and drawn channeled body. The channels are shown as periodic array 22 which are formed in the glass 20.

It will be understood that the structure of FIG. 2b may be formed such that the periodic array 22 is an array of glass filament ends, in which the dielectric constant of glass array 22 is different from that of glass matrix 20. Thus in describing a body having channels, applicants at the same time are describing a body comprising a first and a second glass one embedded in the other to form a periodic array of dielectric constant differences.

An important feature of the invention is the capability of substantially preserving the extruded shape through subsequent process steps in which a cross section of the shape is reduced in size.

Figure 2C:
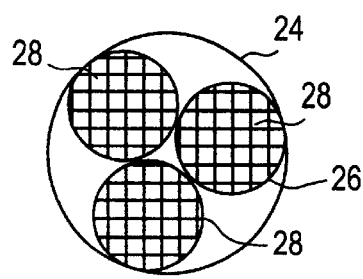
FIG. 2c is an illustration of a bundle of extruded bodies prior to drawing.

To produce a photonic crystal having a pre-selected periodicity, illustrated as surfaces 28 in FIG. 2c, and a larger surface area, a plurality of extruded or extruded and reduced channeled bodies, 26 in FIG. 2c, may be bundled, using for example a surrounding tube 24 as a drawing aid, and drawn as a unit. As an alternative, channeled bodies having different periodicity may be bundled as shown in FIG. 2c and drawn as a unit, thereby producing a set of photonic crystals having different band pass and band gap wavelengths. The units so drawn may be several interleaved periodicities and have different crystal structures or be comprised of misaligned crystals. Some of the channeled bodies may have a periodicity intentionally made to be random. The need for data in this field fits well with the versatility of the process combinations described and disclosed herein.

Figure 3:
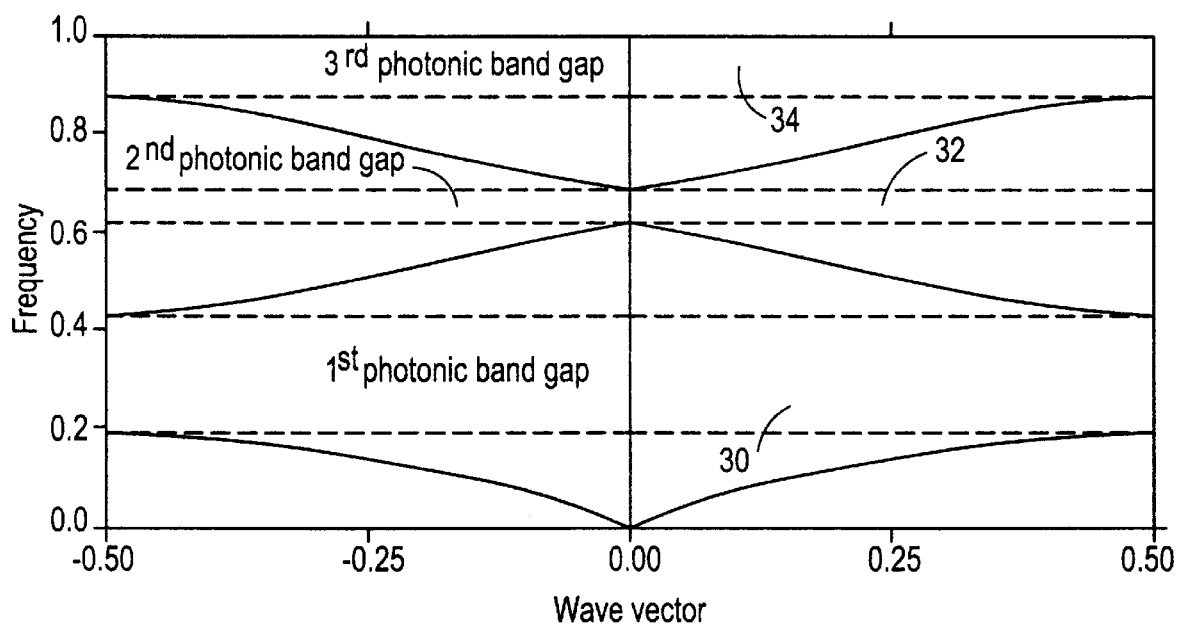
FIG. 3 is a chart showing the pass bands and band gaps of a photonic crystal.

FIG. 3 illustrates the relative sizes of the pass band and band gap wavelength ranges. The frequency, in relative units, of the light is plotted on the y-axis versus the light wave vector on the x-axis, in relative units. The first, second, and third band gaps, 30, 32 and 34, respectively, are shown as frequencies within the dashed lines. The allowed or propagated frequency bands are above and below each of the gaps.

Figure 4:
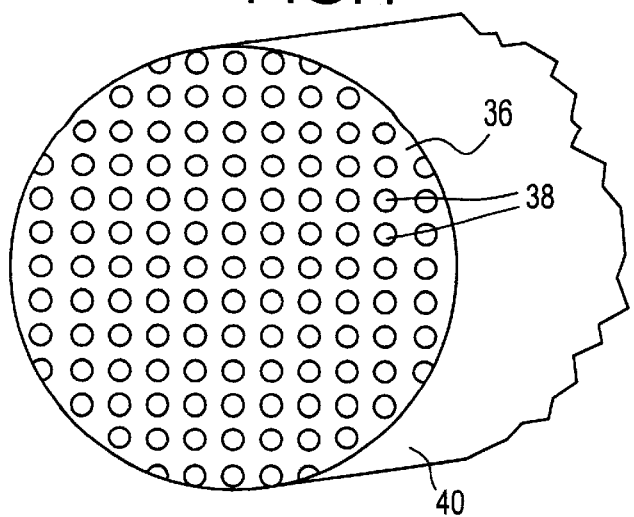
FIG. 4 is an illustration of a cross section taken through the long axis of the extruded or drawn photonic crystal in which the periodic features are shown.

An embodiment of a photonic crystal made using the method described herein is shown in FIG. 4. The extrusion steps and subsequent sintering and drawing of the extruded body produces an elongated rod or fiber 40 having a periodic array of channels 38 extending through matrix glass 36.

Figure 5:
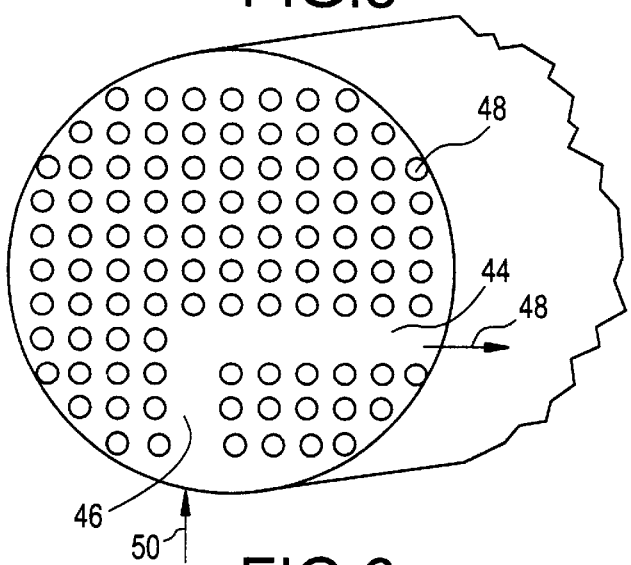
FIG. 5 is an illustration of a 2-D photonic crystal having a waveguide path therethrough.

Another embodiment of a photonic crystal made using the method disclosed, is illustrated in FIG. 5. Here the periodic pattern of channels has been altered to include two intersecting line defects 44 and 46. The width of the line defect is chosen such that the intersecting line defects serve as waveguide paths for light having a wavelength in the band gap of the crystal. The photonic crystal guides the light, even around a sharp bend, without producing any excess loss. Arrows 48 and 50 indicate a direction of travel of the light. The waveguide path is formed in the crystal in the first extruding step and maintained therein through the heating and drawing step. Note that the direction of light travel in this embodiment is at a non-zero angle with respect to the photonic crystal centerline, so that the light enters and exits from a side of the photonic crystal rod or fiber.

Figure 6:
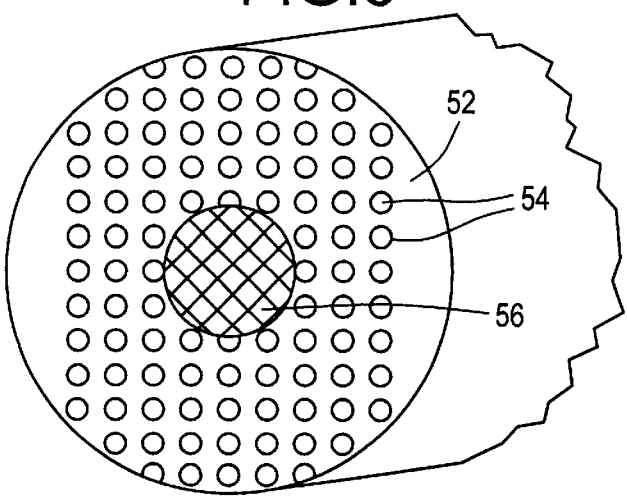
FIG. 6 is an illustration of a waveguide fiber having a solid glass core and a photonic crystal cladding.

A waveguide having a photonic crystal clad layer is illustrated in FIG. 6. A solid glass core 56 is surrounded by photonic crystal 52. The circles 54 indicate the positions of material or the channels which form the periodic array of dielectric constants. This waveguide structure, which is readily made by the novel method described herein, has been found (see reference above) to provide an unusually wide range of wavelengths over which the waveguide propagates a single mode.

Figure 7:
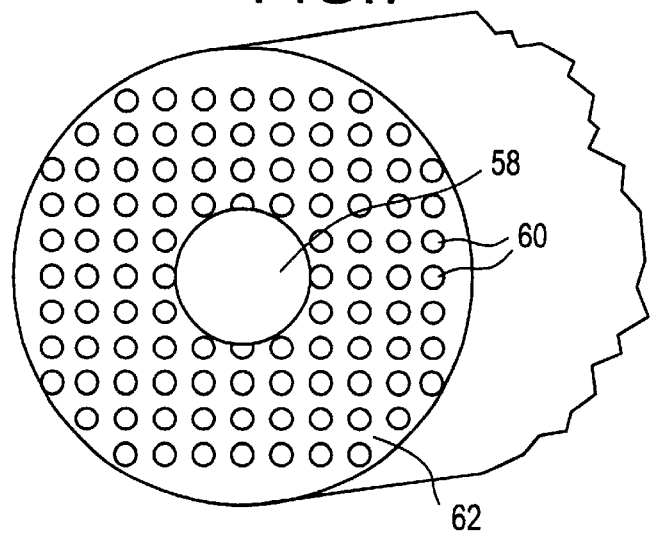
FIG. 7 is an illustration of a waveguide fiber having a large central channel surrounded by a photonic crystal comprised of smaller openings or filaments.

A contemplated waveguide structure which is thought to be of interest is illustrated in FIG. 7. In this case, the core region 58 is a hollow cylinder in the photonic crystal matrix glass 62. As before the circles 60 represent the periodic dielectric constant array embedded in glass 62. Circles 60 represent either channels or glass filaments extending along the waveguide length.

Figure 8:
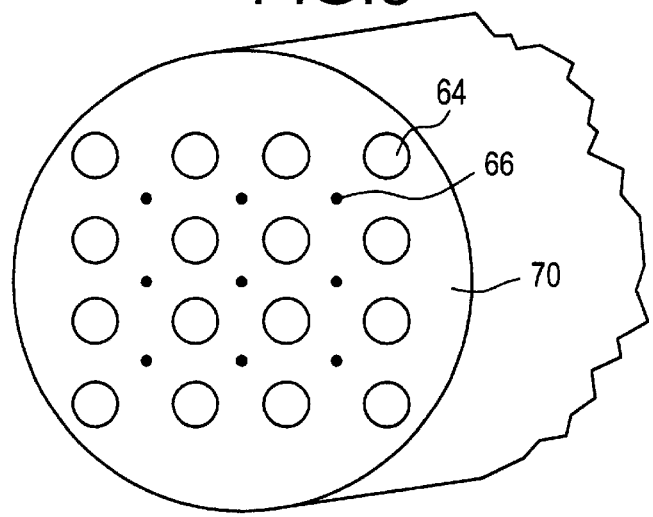
FIG. 8 is an example of channels of different size overlapped to provide a first periodic structure having a first channels size embedded in a second periodic structure having a second channel size.

As an example of the versatility of the novel process, FIG. 8 shows two sets of periodic features 66 and 64 embedded in matrix glass 70. The sets of circles and dots are each representative of a periodic array. The size or periodicity of the feature can be selected to provide a particular band gap. Here again the extrusion technology is well suited to making such overlapping or interwoven structures.

Although various embodiments of the invention have hereinabove been disclosed and described, the invention is nonetheless limited only by the following claims.

We claim:

1. A method of making a photonic crystal which propagates a pre-selected band of wavelengths and has a band gap comprising the steps:
   a) extruding through a die a material comprising at least one glass powder and a binder to form a body having a first face spaced apart from a second face, each face having an area, wherein a plurality of channels extend from the first to the second face and form openings in the respective faces, the channels separated one from another by intervening walls which have a cross section, the cross section of the walls serving to separate the array of openings, one from another, in the respective faces;
   b) heating the body to drive off the binder and viscously sinter the glass powder to form a glass body;
   c) drawing a glass fiber or rod from the glass body.

2. The method of claim 1 wherein the extruding step a) produces a periodic array of channels in the body and channel openings in the respective faces.

3. The method of claim 2 wherein the period of the array of openings is in the range of 0.4 $\mu$m to 5.0 $\mu$m.

4. The method of claim 3 further including the step, evacuating the channels or filling the channels in the glass fiber or rod with a fluid, wherein evacuated channels have a first dielectric constant, fluid filled channels have a second dielectric constant, and the walls have a third dielectric constant, to provide a periodic change in dielectric constant over the first and second face and over any surface area of the glass fiber or rod which intersects the glass fiber or rod and is located between the first and second face.

5. The method of claim 4 in which the dielectric constant of the viscously sintered glass powder is at least a factor of 3 greater than the dielectric constant of the evacuated or fluid filled channels.

6. The method of claim 1 further including the step, prior to the drawing step c), heating the glass body to reduce the viscosity thereof.

7. The method of claim 1 further including the steps after step c) of:
   overcladding the rod or fiber with a glass forming material;
   viscously sintering the glass forming material to form an overclad rod or fiber; and,
   reducing the diameter of the overclad rod or fiber by drawing.

8. The method of claim 1 further including the steps, after step a):
   filling the plurality of channels with a pliable material;
   extruding the body, in a direction parallel to an axis between the first and second faces, through at least one reducing die to reduce the areas of the first and second faces and the area of any cross section of the body which is between the faces; and,
   removing the pliable material from the plurality of channels.

9. The method of claim 8 in which the pliable material comprises a micro-crystalline wax.

10. The method of claim 1 in which the area of the end faces after step c) is in the range of about 100 $\mu$m$^2$ to 1.25 mm$^2$.

11. The method of claim 1 in which the average particle size of the glass powder is about 5 $\mu$m.

12. The method of claim 1 wherein said die provides for at least one line defect in the periodic array of channels.

13. The method of claim 1 wherein said die provides for at least one cavity defect in the periodic array of channels.

14. The method of claim 1 wherein said die provides for a volume of material, which is free of openings, beginning at a centrally located area of the first face and extending along the body to a corresponding area of the second face.

15. The method of claim 1 wherein said die provides for a channel, beginning at a centrally located area of the first face and extending along the body to a centrally located area of the second face, which comprises a cross section larger than the cross section of the channels surrounding the centrally located channel, the larger channel being separated from surrounding channels by intervening walls.

16. The method of claim 1 wherein said die provides a plurality of channels having a cross sectional area of one of N sizes, where N is an integer, so that the plurality of channels forms N groups of channels, in which each channel of a group has a cross section of the same size, and in which each of the N groups of channels is periodically arrayed across each end face in one of N periodic arrays.

17. The method of claim 16 in which N=2 and the period of each of the two periodic arrays is different.

18. A method of making a photonic crystal which propagates a pre-selected band of wavelengths and has a band gap comprising the steps:
   a) extruding through a die a material comprising at least one glass powder and a binder to form a body having an axis between a first face spaced apart from a second face, each face having an area, wherein a plurality of channels extend from the first to the second face and form openings in the respective faces, the channels separated one from another by intervening walls which have a cross section, the cross section of the walls serving to separate the array of openings, one from another, in the respective faces;
   b) heating the body to drive off the binder and viscously sinter the glass powder to form a glass body;
   c) drawing a glass fiber or rod from the glass body;
   d) repeating steps a) through c) to form a plurality of glass fibers or rods;
   e) bundling together at least two of the glass fibers or rods using means for holding the at least two glass fibers or rods in side by side registration along the axes of the glass fibers or rods;
   f) drawing a glass fiber or rod from the bundled glass fibers or rods.

19. The method of claim 18 wherein the extruding step a) produces a periodic array of channels in the body and channel openings in the respective faces.

20. The method of claim 19 wherein the period of the array of openings is in the range of 0.4 $\mu$m to 5.0 $\mu$m.

21. The method of claim 20 further including the step, evacuating the channels or filling the channels in the glass fiber or rod with a fluid, wherein evacuated channels have a first dielectric constant, fluid filled channels have a second dielectric constant, and the walls have a third dielectric constant, to provide a periodic change in dielectric constant over the first and second face and over any surface area of the glass fiber or rod which intersects the glass fiber or rod and is located between the first and second end face areas.

22. The method of claim 21 in which the dielectric constant of the viscously sintered glass powder is at least a factor of 3 greater than the dielectric constant of the evacuated or fluid filled channels.

23. The method of claim 18 further including the step, prior to the drawing step c), heating the glass body to reduce the viscosity thereof.

24. The method of claim 18 further including the steps after step c) of:
   overcladding the rod or fiber with a glass forming material;
   viscously sintering the material to form an overclad rod or fiber; and,
   reducing the diameter of the overclad rod or fiber by drawing.

25. The method of claim 18 further including the steps, after step a):
   filling the plurality of channels with a pliable material;
   extruding the body, in a direction parallel to the axis between the first and second faces, through at least one reducing die to reduce the areas of the first and second faces and the area of any cross section of the body which is between the faces; and,
   removing the pliable material from the plurality of channels.

26. The method of claim 25 in which the pliable material comprises a micro-crystalline wax.

27. The method of claim 18 further including the step, prior to the drawing step c), heating the glass body to reduce the viscosity thereof.

28. The method of claim 18 further including the steps after step c) of:
   overcladding the rod or fiber with a glass forming material;
   viscously sintering the material to form an overclad rod or fiber; and,
   reducing the diameter of the overclad rod or fiber by drawing.

29. A method of making a photonic crystal which propagates a pre-selected band of wavelengths and has a band gap comprising the steps:
   a) extruding through a die a material comprising a first glass powder and a binder and a second glass powder and a binder to form a body having a first face spaced apart from a second face, each face having an area, wherein a plurality of continuous filaments comprising the first glass powder and binder extends from the first to the second face, the filaments separated one from another by walls comprising the second glass powder and binder, wherein the area of each face comprises the filament ends comprising the first glass powder and binder separated one from another by intervening wall cross sections comprising the second glass powder and binder;
   b) heating the body to drive off the binders and viscously sinter the first and second glass powders to form a glass body;
   c) drawing a glass fiber or rod from the glass body.

30. The method of claim 29 wherein the extruding step a) produces a periodic array of filaments in the body and filament ends in the respective faces.

31. The method of claim 30 wherein the period of the array of filaments is in the range of 0.4 $\mu$m to 5.0 $\mu$m.

32. The method of claim 31 in which the filaments and filament ends have a first dielectric constant, and the walls and wall ends have a second dielectric constant, to provide a periodic change in dielectric constant over the first and second face and over any surface area of the glass fiber or rod which intersects the glass fiber or rod and is located between the first and second face.

33. The method of claim 32 which the dielectric constant of the viscously sintered first glass powder is at least a factor of 3 greater than the dielectric constant of the viscously sintered second glass powder.

34. The method of claim 29 in which the average particle size of the first and second glass powder is about 5 $\mu$m.

35. The method of claim 29 further including the step, after step a):
   extruding the body, in a direction parallel to an axis between the first and second face, through at least one reducing die to reduce the areas of the first and second faces and the area of any cross section of the body which is between the faces.

* * * * *